May 22, 1956     J. W. PHILIPPOVIC     2,746,739
DEVICE FOR CONTINUOUS WEIGHING

Filed June 26, 1953     2 Sheets-Sheet 1

INVENTOR
J. W. PHILIPPOVIC
BY
ATTORNEY

May 22, 1956 J. W. PHILIPPOVIC 2,746,739
DEVICE FOR CONTINUOUS WEIGHING
Filed June 26, 1953 2 Sheets-Sheet 2

INVENTOR
J. W. PHILIPPOVIC
BY
ATTORNEY

United States Patent Office 2,746,739
Patented May 22, 1956

2,746,739

DEVICE FOR CONTINUOUS WEIGHING

Joachim Wolfgang Philippović, Indiana, Pa., assignor to Syntron Company, Homer City, Pa., a corporation of Delaware Application June 26, 1953, Serial No. 364,410

2 Claims. (Cl. 265—28)

This invention relates generally to method and apparatus for continuous weighing and more particularly to method and apparatus for weighing the material being conveyed by an endless belt.

The present methods and devices for continuous weighing have not given practical results on account of their complexity and the instability of their adjustment, which are affected by external influences such as the temperature.

It is the object of the present invention to provide a method and apparatus for continuous weighing of material, which is positive and simple to apply.

Another object is to provide structures which are robust and stable, and which register to indicate the total weight of the conveyed material regardless of the running speed of the conveyor.

Generally, the invention consists in supporting the weight of material which is situated on a part of the conveyor on a magnetostrictive cell and transmits the variations furnished by this cell to a magnetic amplifier. The output current of this amplifier is supplied to a potentiometer whose resistance value is selected as a function of the speed of the conveyor carrying the material past a fixed point and in such a manner that the difference of the potential of one end of the potentiometer and of the intermediate movable contact thereof, shall at the same time be proportional to the weight of the material situated on the conveyor at that point, and to its passing speed. Lastly, current is also supplied to the driving motor of a registering device indicating the total weight of the conveyed material as a function of the time.

In one form of this invention the material is conveyed on a transporter consisting of an endless belt driven in a continuous movement, and one part of this belt rests on a balanced chassis, which is supported by a magnetostrictive cell. The belt is driven by a motor fed from a suitable supply line. The motor or a pulley of the driving system of the belt drive is also used to drive a tachometric generator, the current of which is used to drive a motor that is actuated by the difference in voltage delivered by the tachometric generator and by the line circuit voltage corrected in function of the speed of transport. This motor moves the index of a potentiometer, from the taps of which pass come the current of the amplifier which serves to amplify the current of the magnetostriction cell. The voltage obtained between the index or movable point of the potentiometer and its end tapping is used to drive the motor of a totalizator register.

The invention is applicable to all types of transporters known to advance material along a path. These conveyors can be of continuous drive, of pulley, belt, or shakings or of vibratory movement. It gives a device of weighing, which is robust, stable, functioning on the line current, and independent of the cyclic fluctuations. This arrangement presents also the following advantages: It produces its own amplification for greater loads by delivering a higher current. It answers quickly to the weight variations and compensates automatically the speed variations of the advancing material. It necessitates slight displacement of the weigh bridge, and lastly, it is not subject to any aging phenomena and the atmospheric and temperature conditions having no effect upon it.

Other objects and advantages appear hereinafter in the following description and claims:

Accompanying drawings show for the purpose of exemplification, without limiting the invention or claims thereto, certain practical embodiments illustrating the principles of the invention wherein:

Figure 1:
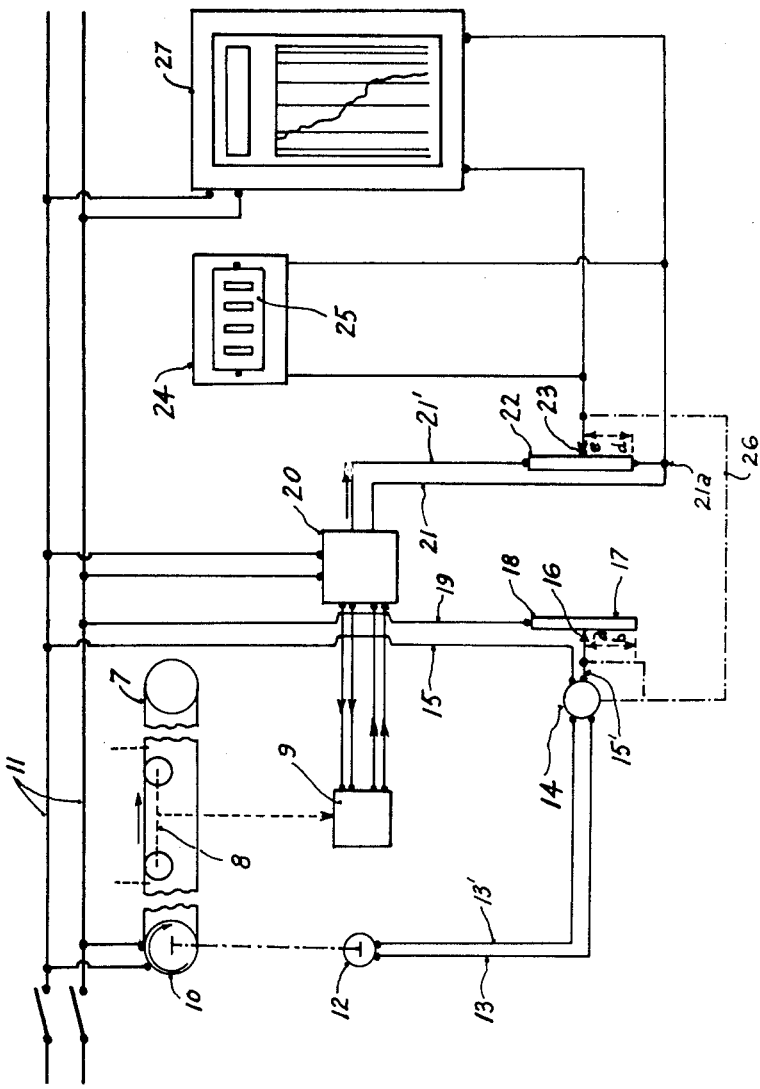
Fig. 1 is a schematic circuit diagram of this invention.
Figure 2:
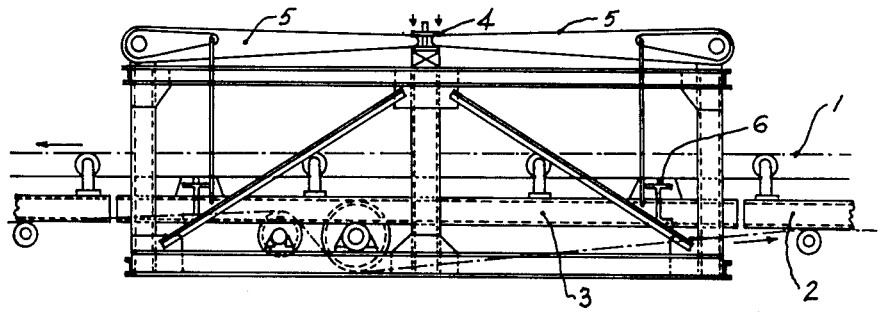
Fig. 2 is an elevational view of the weighing chassis acting on the magnetostriction cell.
Figure 3:
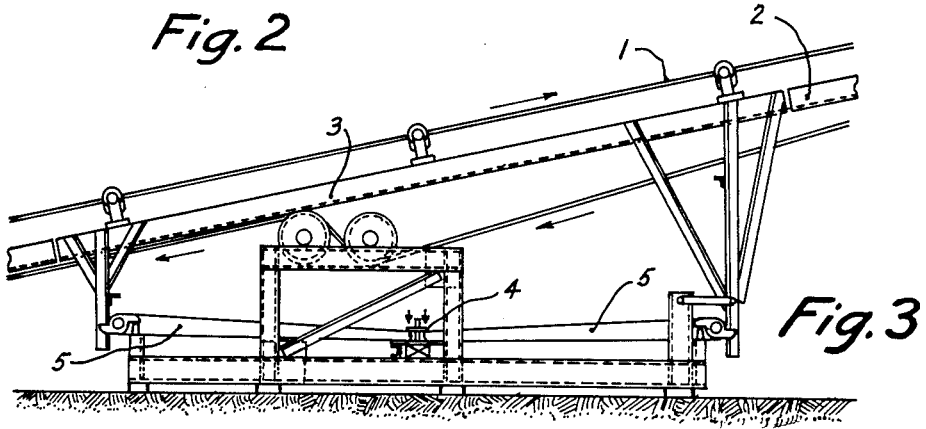
Fig. 3 is an elevational view of the weighing chassis acting on the magnetostriction cell.
Figure 4:
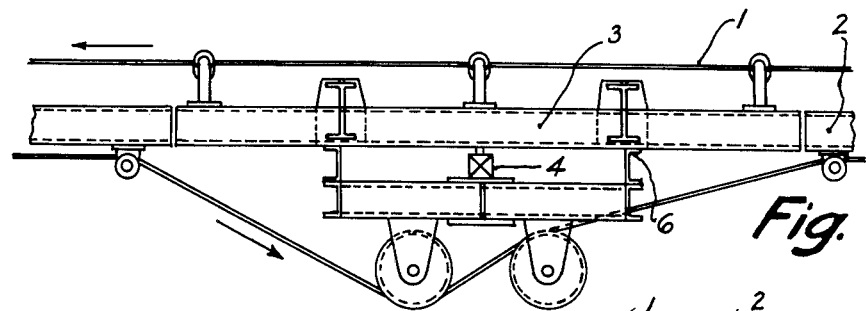
Fig. 4 is an elevational view of the weighing chassis acting on the magnetostriction cell.
Figure 5:
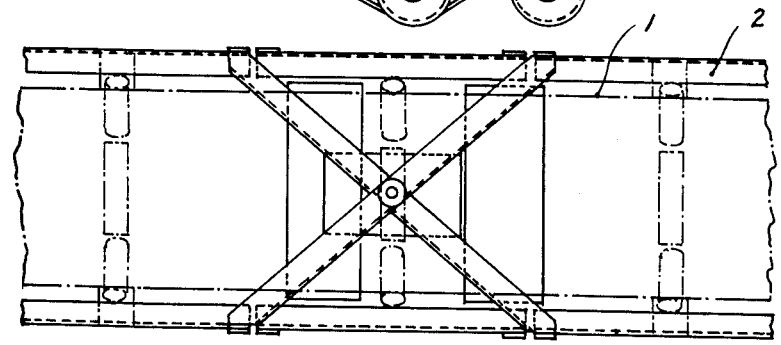
Fig. 5 is a plan view of Fig. 4.

According to the invention, a belt conveyor carries a chassis whose weight, as well as that of part of the weight of the belt which it supports, is transmitted to a magnetostriction cell.

Different supporting structures are represented in Figs. 2 to 5. In these figures the reference 1 indicates the conveyor belt mounted on rollers. This belt rests on a structure 2 which carries an articulated part 3 which rests on a magnetostriction cell 4. In accordance with the case, the chassis 3 exercises either a tractive effort on the cell 4 (Fig. 3), or a compressive action (Figs. 2 and 4), or acts directly by means of levers 5 multiplying in a convenient way the weight of the material. Articulated ties 6 connect the chassis 3 with the contiguous elements of the structure 2 to assure its guidance. In practice the chassis 3 remains stationary.

Considering now the Fig. 1, which shows the arrangement scheme, in which the conveyor belt is represented by 7 and the weigh bridge by 8, this rests on the magnetostriction cell 9 and the pressure thereon causes it to function. The drive of the belt 7 is done by a motor 10 receiving its supply from the normal electric supply line 11. This motor or a pulley of the transporter, is mechanically connected with a tachometric generator 12, so that the current generation of this generator is proportional to the rotating speed of the motor 10, and thus to the advancing speed of the belt 7.

The contacts of the generator 12 are connected by the conductors 13, 13' to the contacts of the motor 14 that opposes the rotation induced by the energy supplied to the other two contacts of motor 14 which are fed by a wire 15 and 15', the latter being connected to movable contact 16 of a potentiometer 17 whose contact 18 is connected to the same source of electric supply 11 by means of the conductor 19.

The motor 14 functions therefore, under the difference of potential of the current supplied by the generator 12 and the current supplied by the supply of constant voltage and that from the potentiometer 17. It serves to displace, by convenient mechanical means, the movable contact 16 so that at any instance the distance $a$, $b$ of the potentiometer is a measure of the speed of the generator 12 and consequently of the speed of the belt 7. The magnetostriction cell 9 is electrically connected to an amplifier 20 from which it receives its excitation and delivers its output. This amplifier is fed by the normal electrical supply line 11 and whose output contacts are connected by the conductors 21 and 21' to the contacts of a potentiometer 22 identical to the potentiometer 17 whose movable contact 23 is displaced by the motor 14 in the same way as the movable contact 16. The potentiometer consists of a low voltage regulating means. These two contacts are moved synchronously by the tachometric motor through the coupler indicated at 26 and the operation of the tachometric motor 14 is in turn controlled by the tachometric generator 12, all of which is generally referred to in the claims as potentiometer means.

The voltage obtained at the contact 21a of the potentiometer and the contact 23 is delivered to a motor 24, which drives the totalizing register 25. One can at the same time drive by this output drive a motor actuated needle of a graphic register 27 whose drum is driven by a synchronous motor fed by the line 11.

In the operation of the device, the tachometric generator 12, the motor 14, the potentiometer 17 form an automatic compensator, so that the distance $a—b$ of the potentiometer corresponds to a certain value of the resistance of the potentiometer and is proportional to the driving speed V of the belt.

The distance $d—e$ of the second potentiometer corresponds by its construction to the same value as $a—b$.

The voltage developed between $c$ and $d$ is proportional to the weight P acting on the belt. It follows that the voltage U developed between $d$ and $e$ is proportional to the product of the speed and the weight, that means it responds to the formula: $U = Cte \times V \times P = Q/\text{sec.}$, Q being the quantity of the material having passed over the chassis in time unit. This signal is transmitted to the motor 24, driving the totalizator 25, as a function of time and giving the product of the integral $M = K \int Q^{dt}$.

Concerning the graphic register, this furnishes the curve of Q/sec. as function of time.

On the totalizator one obtains the value of the total weight transported by the belt.

On the graphic register, the volume of weight of material on the chassis at each determined instance, which provides a control of measurements, is obtained.

If the speed or the weight transported falls to zero, the totalizator registers nothing because the voltage furnished to its motor becomes zero.

One obtains therefore, a continuous registration of the transported material, this registration being automatically connected to the speed of displacement of the material.

Furthermore, the weight indication at a given instant shown by the graphic register can show a small difference in relation to the real weight supported at this moment by the cell. On account of the small inertia of response delay of the apparatus, these differences compensate one another exactly and do not influence the total weight indication which corresponds to the area of the surface described by the curve of the graphic register.

I claim:

1. An apparatus for weighing material traveling along a conveyor which comprises a movable frame mounted to support at least a portion of the conveyor and the material travelling thereon, a tachometric generator connected to be driven in proportion to the speed of movement of the material along the conveyor and provide an output commensurate thereto, a regulating means, a tachometric motor means electrically connected to be actuated by the output of said tachometric generator and mechanically connected to actuate said regulating means in proportion to the variation in the speed of movement of the material along the conveyor, an electrically energized magnetostriction cell means mounted to receive the weight of said frame and the material traveling along said conveyor and having its output connected to said regulating means, a calibrated weight totalizer connected to said regulator means, the output of said regulating means being proportional to the speed and weight of the material traveling along said conveyor and registering the same on said weight calibrated totalizer.

2. An apparatus for weighing material traveling along a conveyor which comprises a movable frame mounted to support at least a portion of the conveyor and the material traveling therealong, an electrically energized magnetostriction cell means mounted to receive the weight of said frame, an amplifier connected to receive the output of said magnetostriction cell means, a plurality of potentiometers each having a variable contactor, the output of said amplifier connected to one potentiometer, a motor having two operating circuits and mechanically connected to drive each of the variable contactors of the potentiometers, a generator connected to be driven in proportion to the speed of the movement of the material along the conveyor to provide an output commensurate thereto and connected to supply one of said operating circuits of said motor, a line circuit connected through the other of said potentiometers and to the other circuit of said motor to energize the same to control the position of the movable contacts of said potentiometers, and a calibrated weight totalizer connected to said one potentiometer to integrate and register the total weight of the material traveling along the conveyor.

References Cited in the file of this patent

UNITED STATES PATENTS

| | | |
|---|---|---|
| 1,067,972 | Comstock | July 22, 1913 |
| 1,174,337 | Messiter | Mar. 7, 1916 |
| 1,777,670 | Hansman | Oct. 7, 1930 |
| 2,261,655 | Lowe | Nov. 4, 1941 |
| 2,571,718 | Howes | Oct. 16, 1951 |
| 2,598,812 | Marco | June 3, 1952 |